United States Patent
Svoboda et al.

(10) Patent No.: US 12,318,716 B2
(45) Date of Patent: Jun. 3, 2025

(54) FILTER SYSTEM COMPRISING A PUMP AND FILTER HEAD MODULE FOR A FILTER SYSTEM

(71) Applicant: MANN+HUMMEL GmbH, Ludwigsburg (DE)

(72) Inventors: Vit Svoboda, Cihalin (CZ); Alexander Meier, Speyer (DE); Mischa Winter, Bruehl (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 188 days.

(21) Appl. No.: 17/854,314

(22) Filed: Jun. 30, 2022

(65) Prior Publication Data

US 2023/0001333 A1    Jan. 5, 2023

(30) Foreign Application Priority Data

Jul. 2, 2021 (EP) .................................... 21183472

(51) Int. Cl.
*B01D 29/33* (2006.01)
*B01D 35/147* (2006.01)
(Continued)

(52) U.S. Cl.
CPC ........... *B01D 29/33* (2013.01); *B01D 35/147* (2013.01); *B01D 35/1573* (2013.01); *B01D 35/26* (2013.01); *B01D 35/30* (2013.01); *B01D 36/001* (2013.01); *B01D 36/003* (2013.01); *B01D 2201/167* (2013.01); *B01D 2201/303* (2013.01);
(Continued)

(58) Field of Classification Search
CPC .. B01D 29/33; B01D 35/147; B01D 35/1573; B01D 35/26; B01D 35/30; B01D 36/001; B01D 36/003; B01D 2201/167; B01D 2201/303; B01D 29/15; B01D 35/153; B01D 35/005; F02M 37/0017;
(Continued)

(56) References Cited

U.S. PATENT DOCUMENTS 5,207,898 A * 5/1993 Hodgkins .............. B01D 35/26
123/198 C
6,328,883 B1  12/2001 Jensen
(Continued)

FOREIGN PATENT DOCUMENTS

CN      101514662 A    8/2009
CN      201818408 U    5/2011
(Continued)

*Primary Examiner* — Madeline Gonzalez (57) ABSTRACT

A filter system for filtering a fluid has a filter housing with filter housing head module and housing cover. The filter housing accommodates a filter element with raw side and clean side. A fluid inlet is in fluid connection with the raw side of the filter element. A fluid outlet is in fluid connection with the clean side of the filter element. The filter housing head module has a tube section as a main channel connecting the clean side of the filter element to the fluid outlet when the housing cover is attached to the filter housing head module. The tube section projects into the clean side of the filter element and has a ball valve seat of a ball valve for closing or opening the main channel. The filter housing head module has a pump chamber of a pump as a bypass channel bypassing the ball valve seat.

20 Claims, 7 Drawing Sheets

(51) Int. Cl.
*B01D 35/157* (2006.01)
*B01D 35/26* (2006.01)
*B01D 35/30* (2006.01)
*B01D 36/00* (2006.01)
*F02M 37/00* (2006.01)
*F02M 37/32* (2019.01)

(52) U.S. Cl.
CPC ......... *F02M 37/0017* (2013.01); *F02M 37/32* (2019.01)

(58) Field of Classification Search
CPC ........ F02M 37/32; F02M 37/16; F02M 37/24; F02M 37/44; F02M 37/48; F04B 53/1002
USPC ... 210/100, 97, 130, 120, 258, 416.1, 416.4, 210/436, 437, 438, 440–444, 450, 455, 210/457, 472; 123/179.9, 179.11, 196 A, 123/198 C; 184/6.28
See application file for complete search history.

(56) References Cited

U.S. PATENT DOCUMENTS

| | | |
|---|---|---|
| 2014/0216996 A1 | 8/2014 | Girondi |
| 2018/0169549 A1* | 6/2018 | Pribanic ............... B01D 36/001 |
| 2018/0221797 A1 | 8/2018 | Agrawal |

FOREIGN PATENT DOCUMENTS

| | | | |
|---|---|---|---|
| CN | 102734016 A | | 10/2012 |
| CN | 103470414 A | * | 12/2013 |
| CN | 107882668 A | | 4/2018 |
| CN | 107905929 A | | 4/2018 |
| CN | 109763922 A | | 5/2019 |
| CN | 209293944 U | | 8/2019 |
| CN | 211573670 U | | 9/2020 |

* cited by examiner

FILTER SYSTEM COMPRISING A PUMP AND FILTER HEAD MODULE FOR A FILTER SYSTEM

TECHNICAL FIELD

The invention relates to a filter system comprising a pump and a filter head module for such a filter system.

BACKGROUND OF THE INVENTION

CN103470414A discloses a filter system comprising a filter element and a manual fuel delivery pump for a fuel filter. A removable insert is arranged in a main channel between the inside of the filter element and the fuel outlet. The insert comprises a mushroom valve which is closed when the engine is at standstill. The insert comprises a bypass channel towards the pump which allows fuel to bypass the main mushroom valve in the main channel. When the engine is running, fuel is flowing from the fuel inlet through the filter element, through the insert and through the mushroom valve towards the fuel outlet. When the engine is at standstill and the pump is activated, fuel can bypass the main mushroom valve in the main channel. Fuel is then sucked from the fuel inlet through the filter element through a first mushroom valve into the pump and evacuated through a second mushroom valve from the pump to the fuel outlet while the main mushroom valve in the main channel is closed.

SUMMARY OF THE INVENTION

It is an object of the invention to provide a more efficient filter system comprising a pump, in particular a hand pump.

Another object of the invention is to provide a filter housing head module for such a filter system.

The first object is achieved by a filter system for filtering a fluid, in particular for filtering fuel, comprising a filter housing having a filter housing head module and a housing cover, the filter housing being configured to accommodate a filter element having a raw side and a clean side, and having a fluid inlet in fluid connection to the raw side and a fluid outlet in fluid connection with the clean side, the filter housing head module comprising a tube section being configured as a main channel connecting the clean side of the filter element to the fluid outlet when the housing cover is attached to the filter housing head module, the tube section projecting into the clean side of the filter element and comprising a ball valve seat for closing or opening the main channel, the filter housing head module comprising a pump chamber of a pump, in particular a hand pump, configured as a bypass channel for bypassing the ball valve seat.

Another object is achieved by a filter housing head module for a filter system, the filter housing head module comprising a tube section being configured as a main channel connecting a clean side of a filter element to a fluid outlet when a housing cover is attached to the filter housing head module, the tube section projecting into the clean side of the filter element and comprising a ball valve seat for closing or opening the main channel, the filter housing head module comprising a pump chamber of a pump configured as a bypass channel for bypassing the ball valve seat.

Favorable embodiments and advantages of the invention are apparent from the further claims, the description, and the drawings.

In a first aspect of the invention, a filter system for filtering a fluid is proposed, in particular for filtering fuel. The filter system comprises a filter housing having a filter housing head module and a housing cover, the filter housing being configured to accommodate a filter element having a raw side and a clean side. The filter system further has a fluid inlet in fluid connection with the raw side and a fluid outlet in fluid connection with the clean side. The filter housing head module comprises a tube section being configured as a main channel connecting the clean side of the filter element to the fluid outlet when the housing cover is attached to the filter housing head module. The tube section projects into the clean side of the filter element and comprises a ball valve seat of a ball valve for closing or opening the main channel. The filter housing head module comprises a pump chamber of a pump, in particular a hand pump, configured as a bypass channel for bypassing the ball valve seat.

The pump is arranged completely at the clean side of the filter element. The hand pump function may be achieved by two valves integrated in the pump chamber which are not in contact with the main flow of the fluid in the main channel. The main flow of the fluid can pass through the main channel bypassing the pump chamber.

Favorably, the ball valve may act additionally as a check valve when the housing cover is removed from the filter housing head module, e.g., for exchanging the filter element.

A high volume per stroke of the pump, in particular hand pump, can be achieved. As the pump is arranged at the clean side, contamination with dirt particles which could lead to malfunction can be avoided. A low differential pressure due to bypassing the pump in normal operation due to the ball valve design can be achieved. In contrast to the prior art, a restriction of the cross section of the main channel caused by a valve seat can be avoided.

The pump can be accessed from the front side of the filter system or from the top of the filter system. Less installation space is needed compared to piston pumps.

During normal operation, the fluid flow lifts a ball of the ball valve, which is placed inside the main channel, and streams to the outlet of the filter system. When the pump is activated, the fluid flow streams through two valves inside the pump chamber. The ball in the main channel closes the main channel and allows for a fluid bypass through the pump housing.

Favorably, the closure ball of the ball valve may be made out of polyoxymethylene (POM) so that no elastomer is needed for the valve closure body so that the ball valve is robust and a lifetime part. As the ball valve can also act as a check valve, the ball valve may also substitute a separate check valve.

The filter system is particularly useful for fuel prefilters, such as diesel prefilters for trucks and heavy duty. All components of the pump can be placed on the clean side of the filter system. This leads to a good protection of the pump components against particles. Especially the sealing components are very sensitive to particles because these particles may cause a leakage. When the sealing is not working properly, the pump cannot build up pressure and consequently does not work. The clean side pump ensures a proper function over the complete lifetime of the filter system.

The invention allows for low differential pressure due to the ball valve and because there is no flow in the pump valves in the normal operation flow, a cost efficient solution with a low number of machining processes, a fail-safe design with no particles in the pump, function integration of a venting screw in the main channel, i.e., venting function and closing function of the channel, as well as function integration of the pump mushroom valves and the ball valve acting like a check valve.

According to a favorable embodiment of the filter system, the pump chamber may be connected to the main channel by a first valve upstream of the ball valve seat and a second valve downstream of the ball valve seat. In particular, the valves may be configured as mushroom valves.

Low machining costs result from the low number of machining treatments as mushroom valve seats need no machining. Favorably, mushroom valves can be made from same parts, as only the assembly direction of the closure elastomer part is different.

According to a favorable embodiment of the filter system, the valves, in particular mushroom valves, may be integrated in the pump chamber. During normal operation of the filter system, fluid flow can bypass the pump, thus reducing the differential pressure of the system. The lower the differential pressure, the longer the service intervals, thus saving costs for servicing the filter system.

According to a favorable embodiment of the filter system, the tube section may comprise a sealing area at a free end of the tube section for sealing between the raw side and the clean side of the filter element. The ball valve seat may be arranged at an end of the tube section opposing the free end of the tube section. When the filter element is to be mounted in the housing of the filter system, the end cap of the filter element may simply be slipped over the sealing area of the tube section.

According to a favorable embodiment of the filter system, the ball valve seat may be arranged between the main channel and a venting valve. Favorably, the venting valve may be arranged in axial direction essentially above the ball valve seat. This allows for a compact arrangement of the filter housing head module and the filter system. By using a ball valve, the ball can be completely removed from the fluid flow during normal operating conditions of the filter system.

According to a favorable embodiment of the filter system, the venting valve is arranged in an axial projection of the main channel. Favorably, the venting valve may be arranged in axial direction essentially above the tube section. This allows for a compact arrangement of the filter housing head module and the filter system.

According to a favorable embodiment of the filter system, the venting valve may provide an end stop for the ball of the ball valve seat. When the ball is lifted from the valve seat during normal operation conditions with fluid flowing through the filter element, the ball can be stopped in a defined position.

According to a favorable embodiment of the filter system, the housing cover may comprise a water separator unit. Favorably, water can be separated from the fluid, in particular from diesel, and removed from the housing and the filter system.

According to another aspect of the invention, a filter housing head module for a filter system is proposed, the filter housing head module comprising a tube section being configured as a main channel connecting a clean side of a filter element to a fluid outlet when a housing cover is attached to the filter housing head module. The tube section projects into the clean side of the filter element and comprises a ball valve seat of a ball valve for closing or opening the main channel, the filter housing head module comprising a pump chamber of a pump configured as a bypass channel for bypassing the ball valve seat.

Favorably, the tube section, valve seat, and pump chamber can be integrally made from one piece of material. An attachment for attaching the filter housing head module to a body, such as a vehicle, may be integrally comprised by the filter housing head module, too.

A filter housing head module for a filter system with a low differential pressure during normal operation conditions as well as long-time stability of the valve in the main channel can be provided.

The filter housing head module is suitable particularly for a filter system in a re-fuel line of a vehicle, in particular for prefilter systems with hand pumps for trucks, heavy duty, ships, construction machinery, agriculture machinery, etc. as well as high volumes of series production.

According to a favorable embodiment of the filter housing head module, the pump chamber may be connected to the main channel by a first valve upstream of the ball valve seat and a second valve downstream of the ball valve seat. In particular the valves may be configured as mushroom valves. Favorably, the valves may be integrated in the pump chamber.

The pump is arranged completely at the clean side of the filter element. The pump function may be achieved by two valves integrated in the pump chamber which are not in contact with the main flow of the fluid in the main channel. The main flow of the fluid can pass through the main channel bypassing the pump chamber.

Favorably, the ball valve may act additionally as a check valve when the housing cover is removed from the filter housing head module, e.g., for exchanging the filter element.

A high volume per stroke of the pump, in particular hand pump, can be achieved. As the pump is arranged at the clean side, contamination with dirt particles which could lead to malfunction can be avoided. A low differential pressure due to bypassing the pump in normal operation due to the ball valve design can be achieved. In contrast to the prior art, a restriction of the cross section of the main channel caused by a valve seat can be avoided.

The pump can be accessed from the front side of the filter system or from the top of the filter system. Less installation space is needed compared to piston pumps.

According to a favorable embodiment of the filter housing head module, the tube section may comprise a sealing area at a free end of the tube section for sealing between the raw side and the clean side of the filter element. The ball valve seat may be arranged at an end of the tube section opposing the free end of the tube section. When the filter element is to be mounted in the housing of the filter system, the end cap of the filter element may simply be slipped over the sealing area of the tube section.

According to a favorable embodiment of the filter housing head module, the ball valve seat may be arranged between the main channel and a mounting position of a venting valve. Favorably, the venting valve may be arranged in axial direction essentially above the ball valve seat. This allows for a compact arrangement of the filter housing head module and the filter system. By using a ball valve, the ball can be completely removed from the fluid flow during normal operating conditions of the filter system.

According to a favorable embodiment of the filter housing head module, the mounting position of the venting valve may be arranged in an axial projection of the main channel. Favorably, the venting valve may be arranged in axial direction essentially above the tube section. This allows for a compact arrangement of the filter housing head module and the filter system.

According to a favorable embodiment of the filter housing head module, the fluid outlet may be arranged adjacent to the ball valve seat. A low differential pressure can be achieved by short distances in the clean side of the filter element.

According to a favorable embodiment of the filter housing head module, a center line of the tube section may be spaced apart by an offset from a center line of the ball valve seat This allows for flexible arrangement of the pump in the filter housing head module.

BRIEF DESCRIPTION OF THE DRAWINGS

The present invention together with the above-mentioned and other objects and advantages may best be understood from the following detailed description of the embodiments, but is not restricted to the embodiments.

DETAILED DESCRIPTION OF THE DRAWINGS

In the drawings, like elements are referred to with the same reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
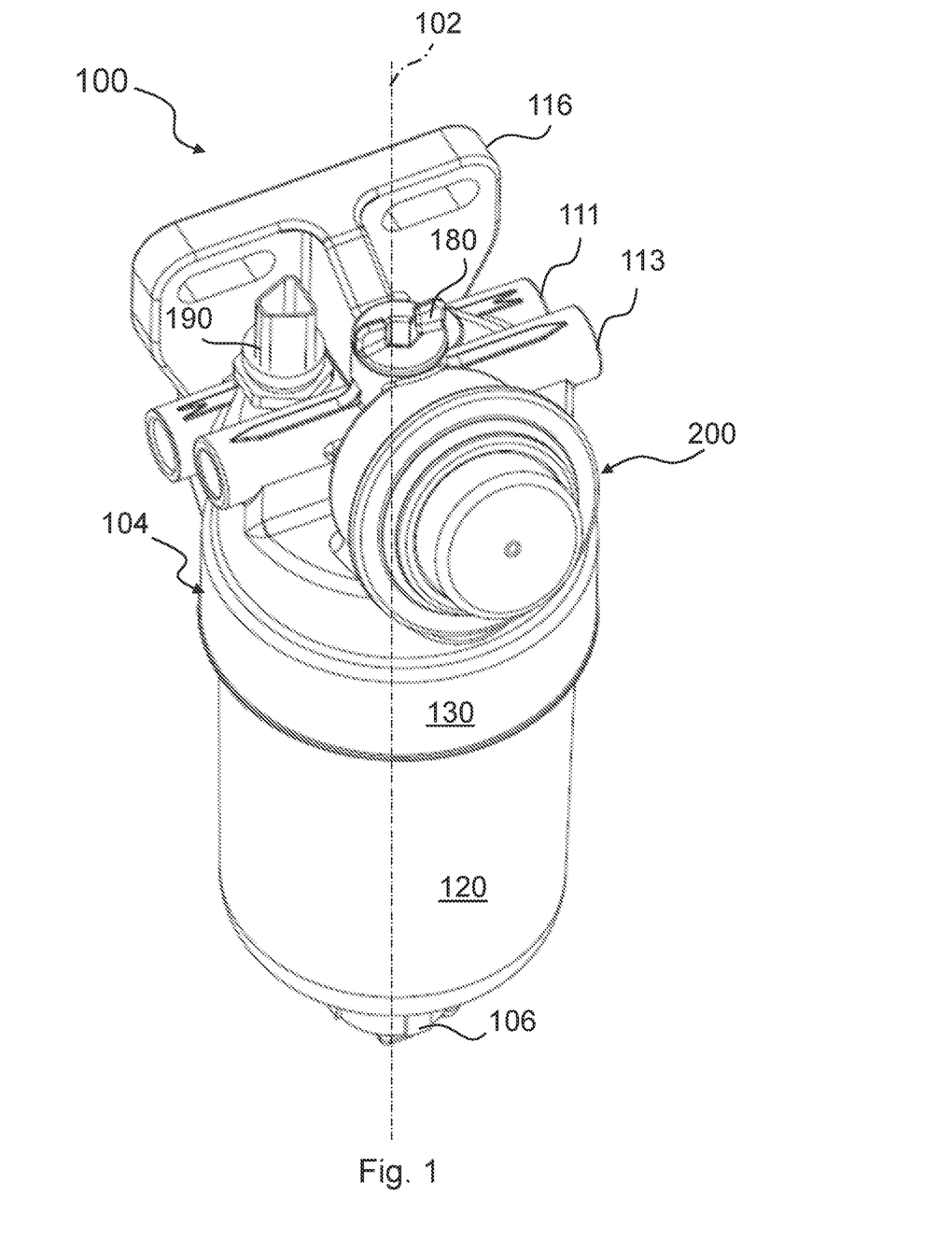
FIG. 1 shows a perspective view of a filter system according to an embodiment of the invention.
Figure 2:
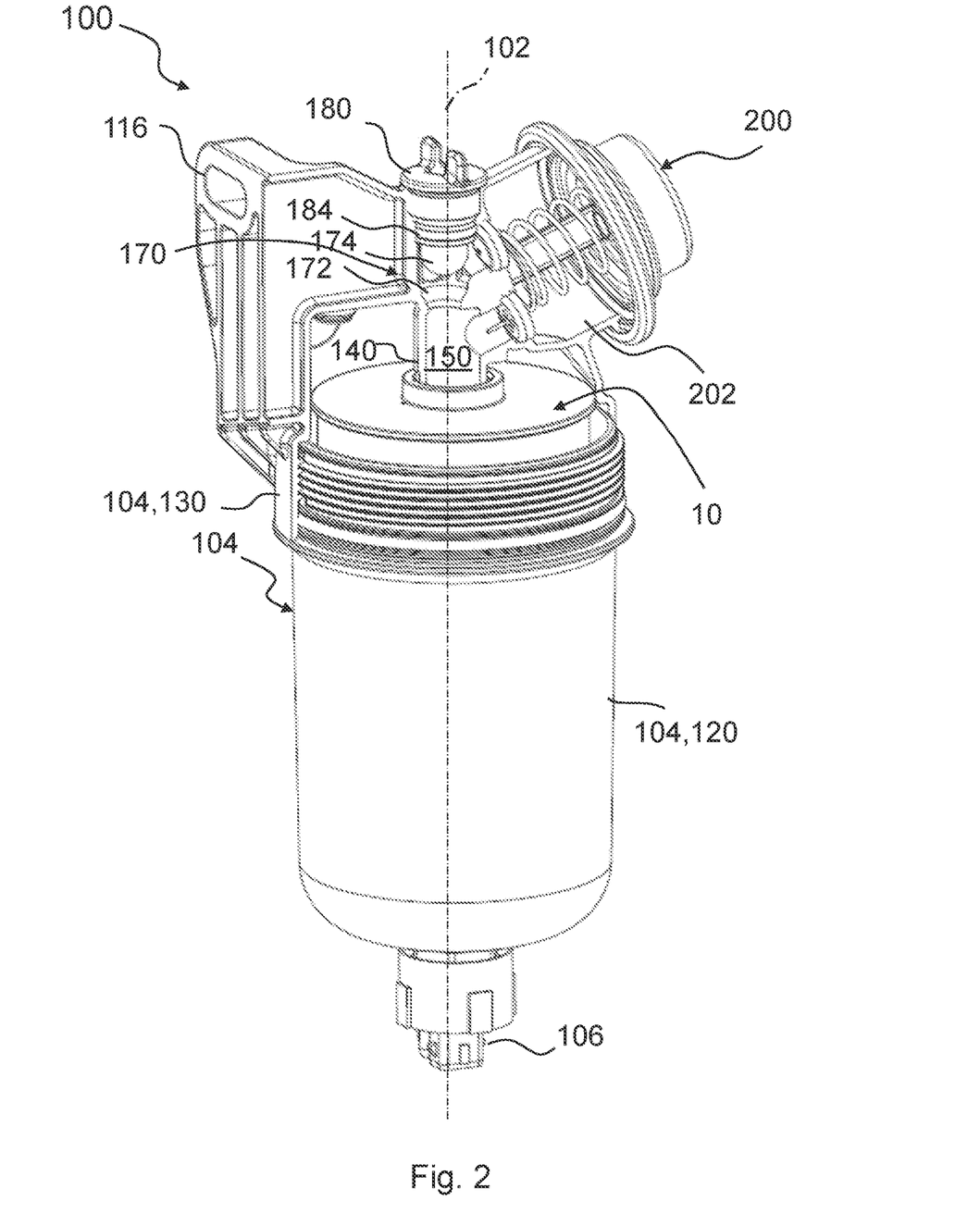
FIG. 2 shows a perspective view of the filter system according to FIG. 1 with a partially cut open filter housing head module.
Figure 3:
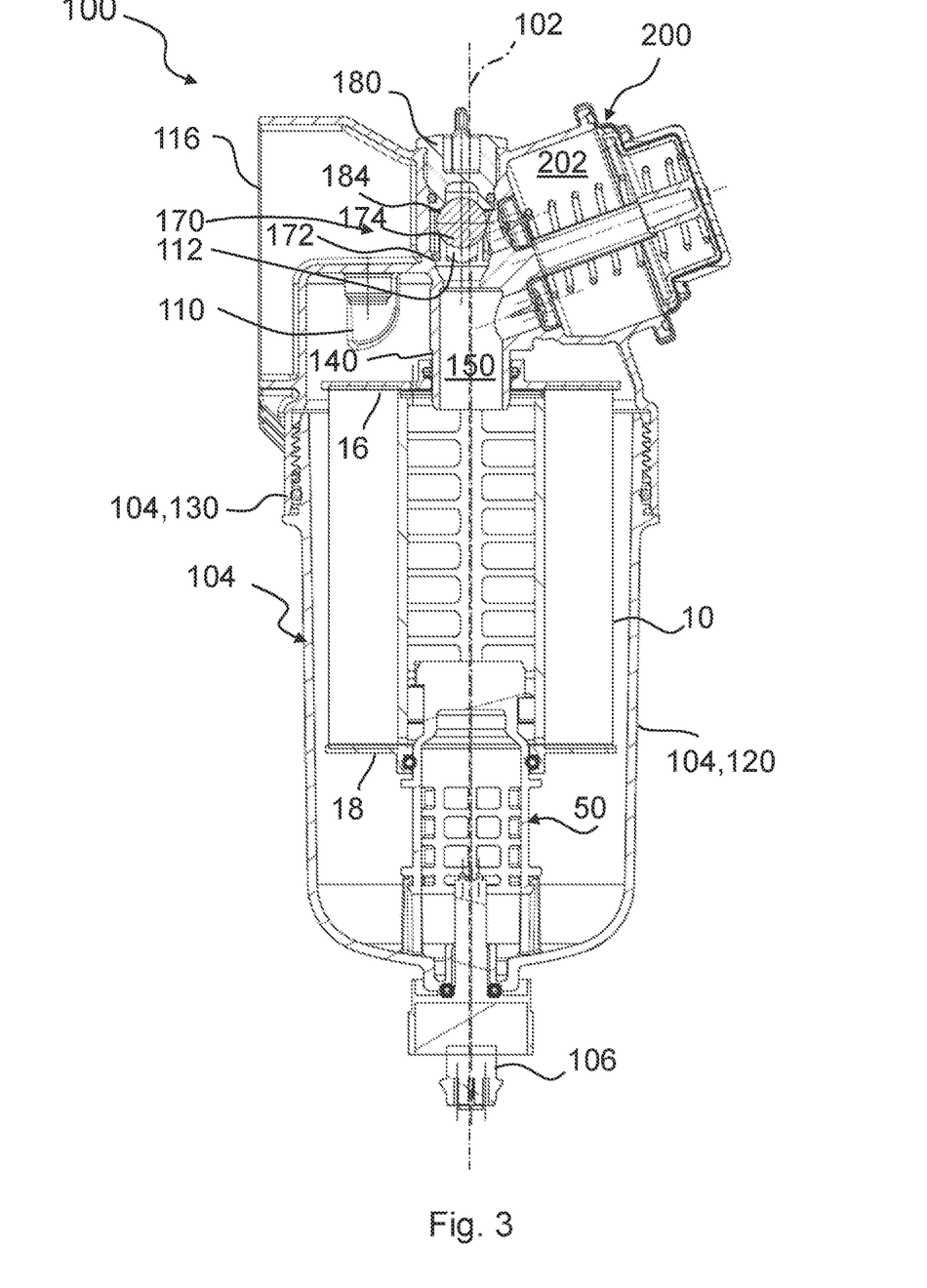
FIG. 3 shows a longitudinal section through the filter system of FIG. 1.
Figure 4:
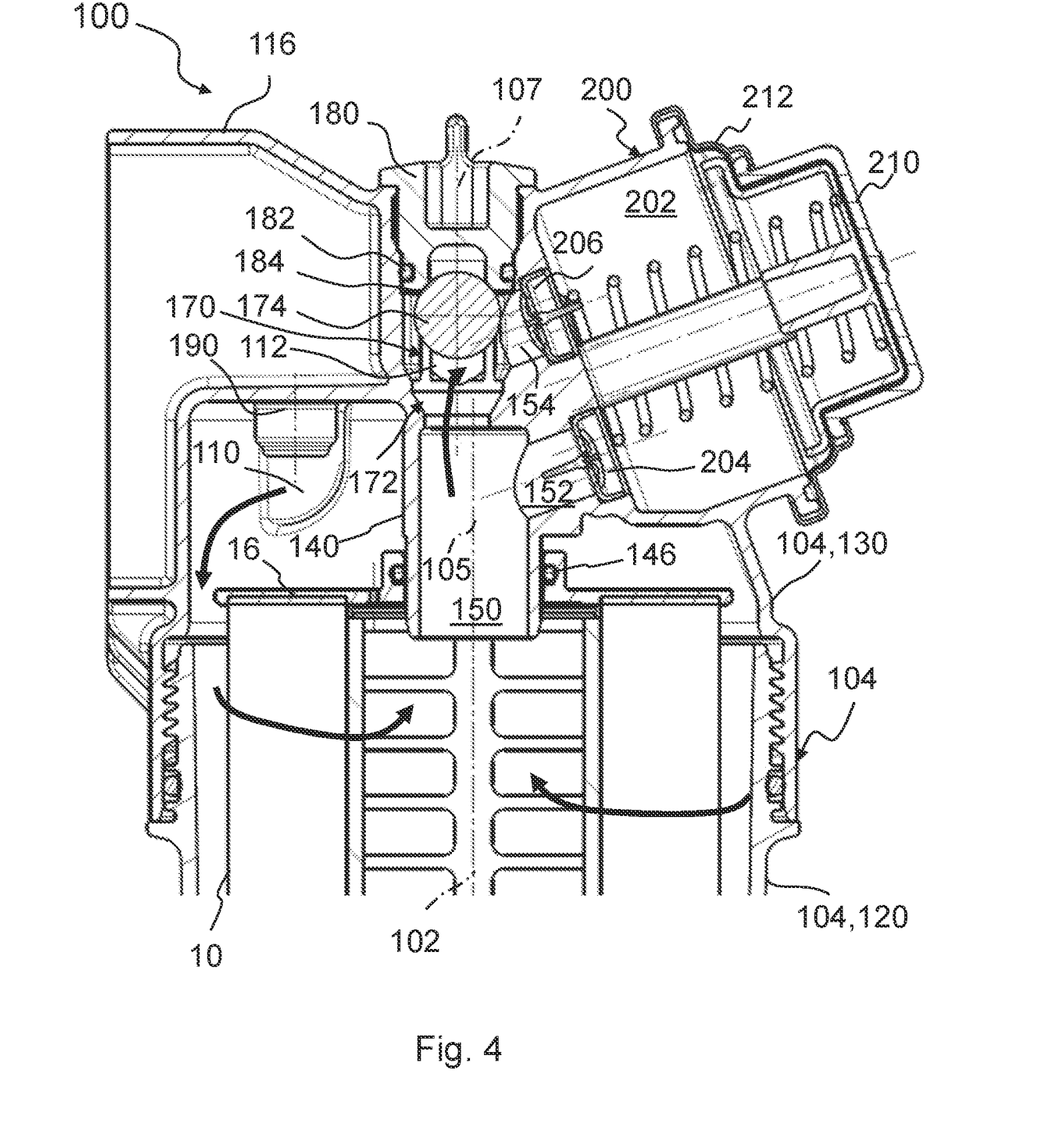
FIG. 4 shows a detail of the view of FIG. 3 with the main channel open.

FIG. 1 illustrates a filter system 100 according to an embodiment of the invention in a perspective view. FIG. 2 shows a perspective view of the filter system 100 according to FIG. 1 with a partially cut open filter housing head module 130. FIG. 3 shows a longitudinal section through the filter system 100 of FIG. 1 and FIG. 4 shows the section of the filter housing head module 130 in an enlarged view. Moreover, FIGS. 2, 3, and 4 show the filter system 100 with a ball valve 170 in open position.

The filter system 100 is used for filtering a fluid, in particular for filtering fuel, preferably for heavy duty engines such as trucks, heavy duty, ships, construction machinery, agriculture machinery and the like.

The filter system 100 comprises filter housing 104 having a filter housing head module 130 and a housing cover 120. An exchangeable filter element 10 is accommodated in the housing 104. The filter element 10 has a raw side 30 and a clean side 40. For instance, the filter element 10 has a closed circumference of a filter medium and a cylinder-like shape. The cross section may be circular, oval, polygonal. In the embodiment of FIG. 1, the clean side 40 is inside the filter element 10 and the raw side 30 is outside the circumference of the filter element 10.

The filter system 100 has a fluid inlet 110 in fluid connection with the raw side 30 and a fluid outlet 112 in fluid connection with the clean side 40 of the filter element 10, the inlet 110 and the outlet 112 being arranged in the filter housing head module 130. The inlet 110 and the outlet 112 are connected to double sided tubes through which fluid is delivered to and evacuated from the filter system 100.

The housing cover 120 comprises a water separator unit 50 at the opposite end of the filter element 10 connected to the lower end cap 18 of the filter element. The collected water is evacuated from the housing cover 120 through a water outlet 106 at the bottom of the housing cover 120.

The filter housing head module 130 comprises an attachment 116 which can be mounted to a body of a vehicle, engine or the like for fixing the filter system 100 to a fluid source and a fluid consumer such as an engine.

For exchanging the filter element 10, the housing cover 120 may be removed from the filter housing head module 130. The filter housing head module 130 and the housing cover 120 are provided with corresponding thread areas for easy connecting and disassembling filter housing head module 130 and cover 120.

The filter housing head module 130 comprises a tube section 140 extending along a longitudinal axis 102. The tube section 140 is configured as a main channel 150 connecting the clean side 40 of the filter element 10 to the fluid outlet 112 when the housing cover 120 is attached to the filter housing head module 130. The fluid which passes through the filter element 10 is evacuated from the filter system 100 through the main channel 150 and outlet 112. By main channel, we mean the flow path through port 150, past the ball valve towards outlet 113. It is not meant that the main channel ends as a bore at the ball valve but rather the flow path is either around the ball valve or through the pump towards the outlet.

The tube section 140 projects into the clean side 40 of the filter element 10 and comprises a ball valve seat 172 of a ball valve 170 for closing or opening the main channel 150. FIGS. 2 and 3 show the ball valve 170 in an open position when the ball 174 is lifted from the ball seat 172 by a fluid flow and rests at the end stop 184 provided by the venting valve 180.

The tube section 140 comprises a sealing area 144 at its outer shell at a free end of the tube section 140 for sealing between the raw side 30 and the clean side 40 of the filter element 10. A sealing ring 146 is arranged between an end cap 16 of the filter element 10 and the sealing area 144 of the tube section 140.

The ball valve seat 172 is arranged at an end of the tube section 140 opposing the free end of the tube section 140. The ball valve seat 172 is arranged between the main channel 150 and a venting valve 180 which is arranged generally above the ball valve 170 and the outlet 112. Close to the inlet 110, a sensor 190 such as a flow sensor may be arranged for measuring the volume flow of the fluid entering the filter system 100.

The venting valve 180 is arranged in an axial projection of the main channel 150 and provides an end stop 184 for the ball 174 of the ball valve seat 172.

The filter housing head module 130 comprises a pump chamber 202 of a pump 200, in particular a hand pump, configured as a bypass channel for bypassing the ball valve seat 172 of the main channel 150.

The tube section 140 and the filter element 10 extend along a longitudinal axis 102 and may have longitudinal axes (center lines) 105, 107 collinear with the axis 102 or being displaced with an offset 176 (FIG. 6) from each other.

The pump 200 comprises a pump chamber 202 which is an integral part of the filter housing head module 130. The pump 200 is composed of the pump chamber 202 arranged at the filter housing head module 130 and a spring 208. The pump stroke can be activated by compressing and relaxing the spring 208 via a membrane 210. The pump chamber 202 is closed by a membrane element with the flexible membrane 210. The membrane element is attached to a flange of the pump chamber 202 by way of, e.g., a metallic collar which is beaded over the flange.

The pump chamber 202 is provided with a first mushroom valve 204 upstream of the ball valve seat 172 and a second mushroom valve 206 downstream of the ball valve seat 172. When the ball valve 170 is in an open position, the valves 204, 206 are closed.

Figure 5:
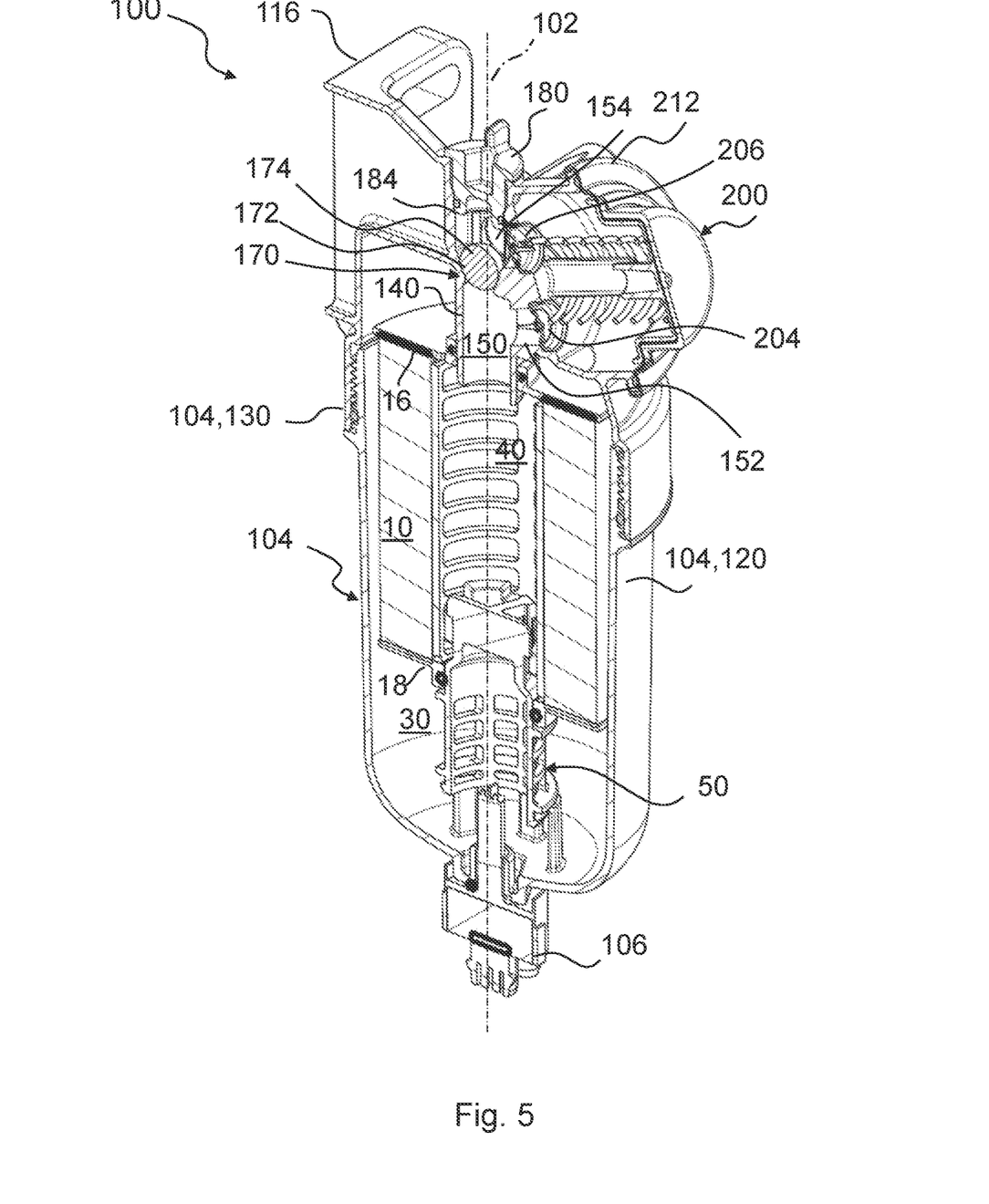
FIG. 5 shows a perspective view of a longitudinal section of the filter system according to FIG. 1 with the main channel closed.
Figure 6:
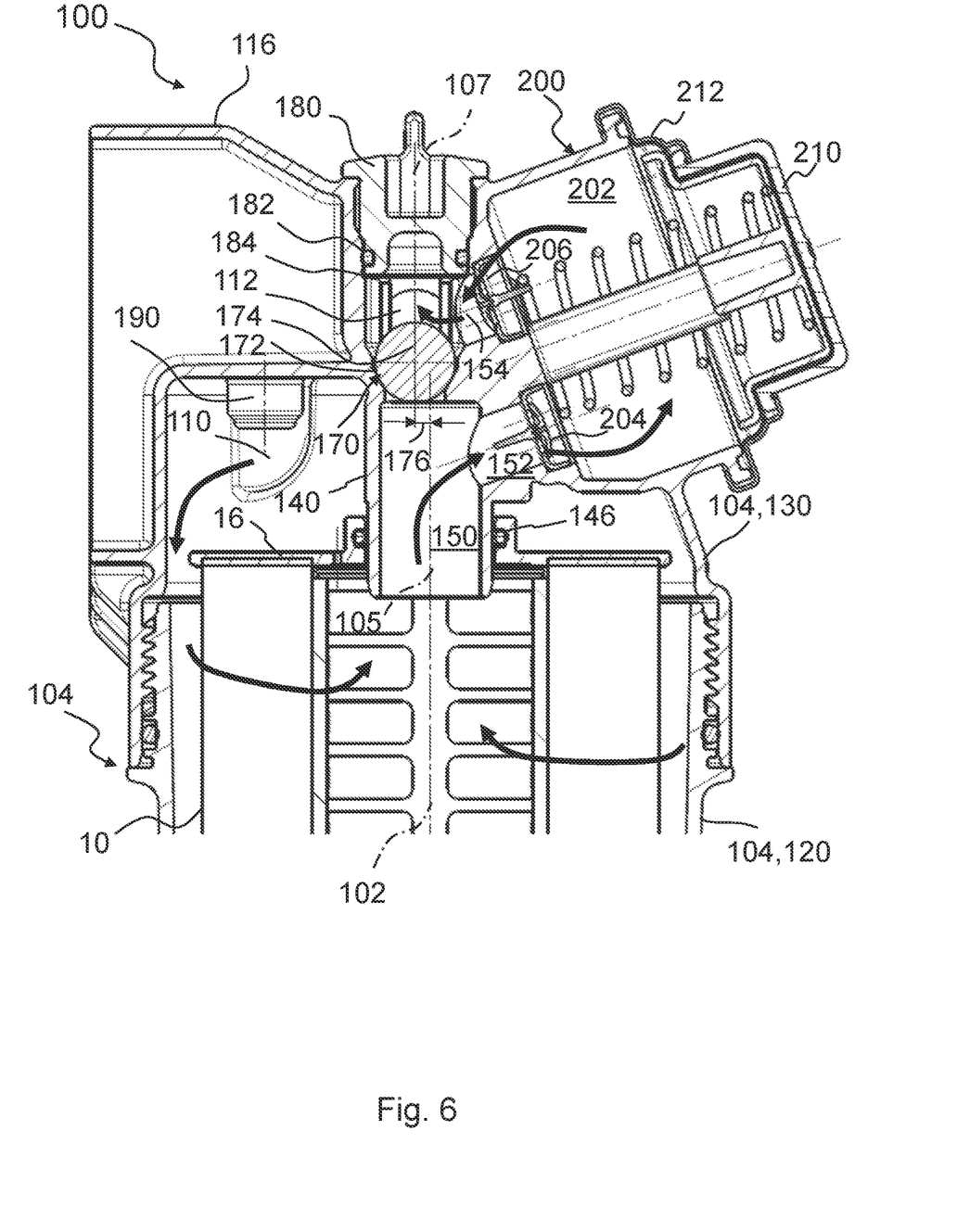
FIG. 6 shows a detail of the view of FIG. 5 with the main channel closed and the bypass through the pump open.
Figure 7:
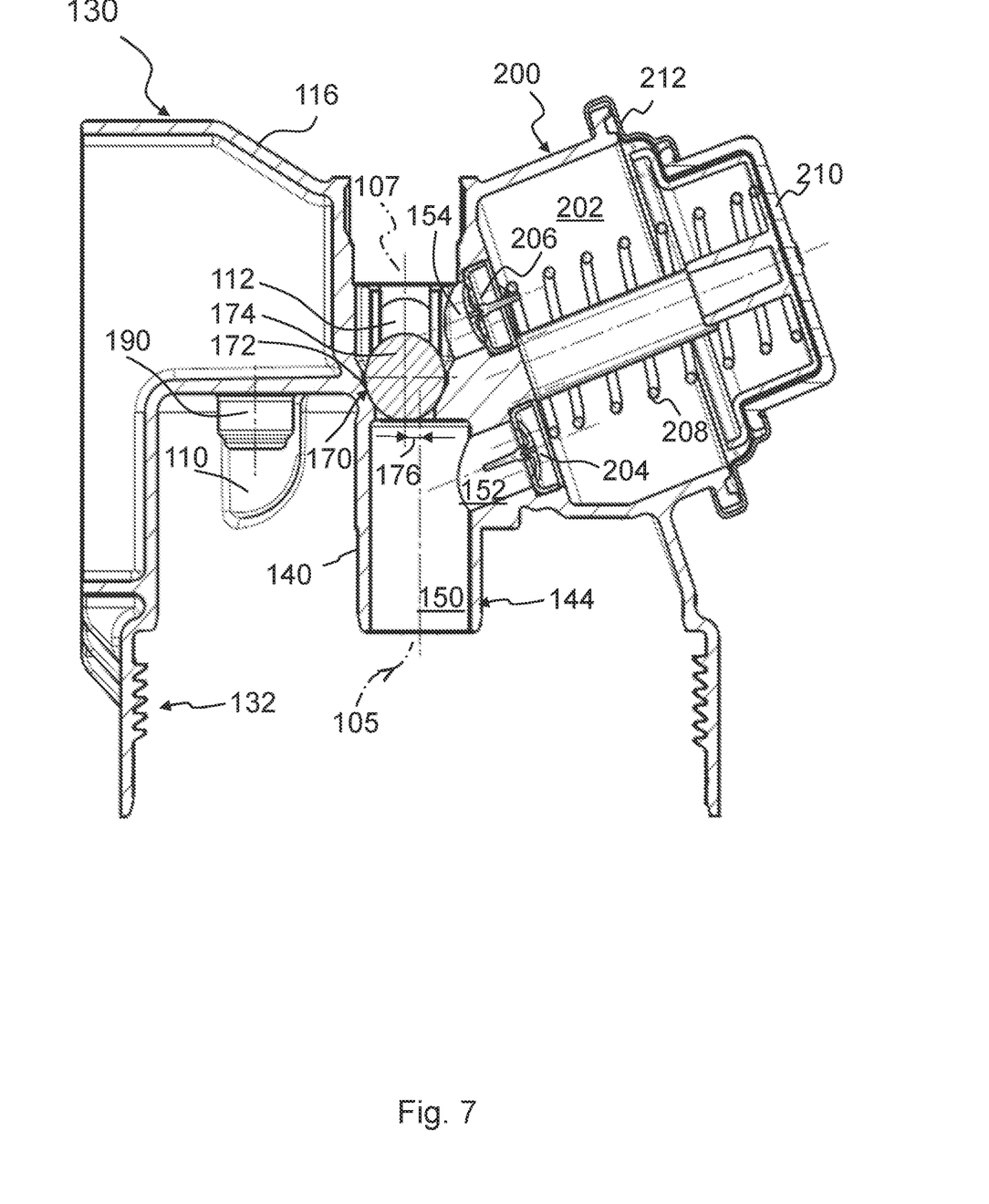
FIG. 7 shows a detail of the view of the filter housing head module of FIG. 5 with the main channel closed.

FIG. 5 shows a perspective view of a longitudinal section of the filter system 100 according to FIG. 1 with main channel 150 closed by the ball valve 170 and FIG. 6 shows a detail of the view of FIG. 5 with main channel 150 closed and a bypass through the pump 200 open. FIG. 7 shows a detail of the view of the filter housing head module 130 of FIG. 5 with the main channel 150 closed.

When the fluid consumer, e.g., an engine, is at standstill, no fluid is flowing through the filter element 10 and outlet 112; the ball 174 of the ball valve 170 is resting on the ball valve seat 172.

When the filter system 100 has to be filled with fluid after exchanging the filter element 10, the pump 200, in particular hand pump, can be activated by compressing the spring 208, which opens the mushroom valve 206 downstream of the ball valve 170, and by letting the spring 208 relax for closing the valve 206 and opening the mushroom valve 204 upstream of the ball valve 170.

Fluid is sucked through the filter element 10 and bypasses the ball valve 170 through the main channel 150, through a first branch 152 via the mushroom valve 204 to the pump chamber 202, and through a second branch 154 via the mushroom valve 206, and is evacuated from the filter system 100 through outlet 112.

FIG. 7 shows a detail of the view of the filter housing head module 130 with the main channel 150 closed.

The filter housing head module 130 is made from one piece and comprises the tube section 140 with the main channel 150 and the ball valve seat 172, the pump chamber 202, an attachment 116, and an interface section 132 for the housing cover 120, for instance, a thread to which the housing cover 120 can be screwed on.

FIG. 7 shows the ball 174 of the ball valve 170 arranged on the valve seat 172 with the venting valve 180 above the ball 174 removed, a sensor 190 mounted to the filter housing head module 130, and the pump 200 assembled with spring 208 and membrane 210 and collar 212.

The mushroom valves 204, 206 are arranged in the pump chamber 202.

As can be seen in FIG. 7, a center line 105 of the tube section 140 is spaced apart by an offset 176 from a center line 107 of the ball valve seat 172.

REFERENCE NUMERALS 10 filter element
12 filter bellows
14 center pipe
16 end cap
18 end cap
30 raw side
32 sealing arrangement
40 clean side
50 water separator
100 filter system
102 axial direction
104 housing
105 center line
106 water outlet
107 center line
110 inlet
111 inlet tube
112 outlet
113 outlet tube
116 attachment
118 sealing ring
120 cover
130 filter housing head module
132 interface section
140 tube section
142 free end
144 sealing area
146 sealing ring
150 main channel
152 bypass branch
154 bypass branch
170 ball valve
172 ball valve seat
174 ball
176 offset
180 venting valve
182 sealing ring
184 end stop
190 sensor
200 pump
202 pump chamber
204 first valve
206 second valve
208 spring
210 membrane
212 collar

What is claimed is:

1. A filter system for filtering a fluid, the filter system comprising:
   a filter housing comprising
      a filter housing head module and
      a housing cover,
      the filter housing configured to accommodate a filter element comprising a raw side and a clean side;
      a fluid inlet and
      a fluid outlet,
      wherein the fluid inlet is in fluid connection with the raw side of the filter element and
      wherein the fluid outlet is in fluid connection with the clean side of the filter element;
   the filter housing head module comprising
      a tube section as a main channel connecting the clean side of the filter element to the fluid outlet when the housing cover is attached to the filter housing head module, the tube section projecting into the clean side of the filter element and comprising
         a ball valve comprising a ball valve seat and a ball for closing the main channel and opening the main channel by a fluid flow lifting the ball from the ball valve seat;
   the filter housing head module further comprising
      a pump chamber of a pump,
      wherein the pump chamber is a bypass channel configured to bypass the ball valve; and
      a venting valve, wherein the ball of the ball valve is arranged inline between the main channel and a mounting position of the venting valve that is arranged in an axial projection of the main channel.

2. The filter system according to claim 1, further comprising
a first valve fluid connecting the pump chamber to the main channel upstream of the ball valve seat of all valve and further comprising
a second valve fluid connecting the pump chamber to the main channel downstream of the ball valve seat of the ball valve,
wherein the first valve is a first mushroom valve and the second valve is a second mushroom valve.

3. The filter system according to claim 2, wherein the first and second mushroom valves are integrated in the pump chamber.

4. The filter system according to claim 1, wherein the tube section comprises
a sealing area at a first end of the tube section and the sealing area is configured to fluid seal between the raw side of the filter element and the clean side of the filter element,
wherein the ball valve is arranged at a second end of the tube section,
wherein the second end is arranged opposing the first end of the tube section.

5. The filter system according to claim 1, wherein the venting valve provides an end stop for the ball of the ball valve.

6. The filter system according to claim 1, wherein the housing cover comprises a water separator unit.

7. The filter system according to claim 1, wherein the fluid outlet of the filter housing is arranged adjacent to the ball valve seat of the ball valve.

8. The filter system according to claim 1, wherein a center line of the tube section is spaced apart by an offset from a center line of the ball valve.

9. The filter system according to claim 1, wherein the pump chamber is integrally formed with the filter housing head module.

10. A filter housing head module for a filter system, the filter housing head module comprising:
a tube section as a main channel configured to fluid connect a clean side of a filter element of the filter system to a fluid outlet of the filter system when a housing cover of the filter system is attached to the filter housing head module;
the tube section configured to project into the clean side of the filter element and comprising
a ball valve comprising a ball valve seat and a ball for closing the main channel or opening the main channel by a fluid flow lifting the ball from the ball valve seat;
the filter housing head module further comprising
a pump chamber,
wherein the pump chamber is a bypass channel configured to bypass the ball valve; and
a venting valve, wherein the ball of the ball value is arranged inline between the main channel and a mounting position of the venting value that is in an axial projection of the main channel.

11. The filter housing head module according to claim 10, further comprising
a first valve fluid connecting the bypass channel to the main channel upstream of the ball valve seat of the ball valve and further comprising
a second valve fluid connecting the bypass channel to the main channel downstream of the ball valve seat of the ball valve.

12. The filter housing head module according to claim 11, wherein
the first valve is a first mushroom valve and
the second valve is a second mushroom valve.

13. The filter housing head module according to claim 11, wherein the first valve and the second valve are integrated in the pump chamber.

14. The filter housing head module according to claim 10, wherein the tube section comprises
a sealing area at a first end of the tube section and the sealing area is configured to fluid seal between a raw side of the filter element and the clean side of the filter element,
wherein the ball valve is arranged at a second end of the tube section, and
wherein the second end is arranged opposing the first end of the tube section.

15. The filter housing head module according to claim 10, wherein
a fluid outlet of the filter system is arranged adjacent to the ball valve seat of the ball valve.

16. The filter housing head module according to claim 10, wherein a center line of the tube section is spaced apart by an offset from a center line of the ball valve.

17. The filter housing head module according to claim 10, further comprising
a venting valve that provides an end stop for the ball of the ball valve.

18. The filter housing head module according to claim 10, wherein the pump chamber is integrally formed with the filter housing head module.

19. The filter housing head module according to claim 10, wherein the ball of the ball valve is comprised of polyoxymethylene (POM).

20. A filter housing head module for a filter system comprising:
a tube section as a main channel configured to fluid connect a clean side of a filter element of the filter system to a fluid outlet of the filter system when a housing cover of the filter system is attached to the filter housing head module;
the tube section configured to project into the clean side of the filter element and comprising
a ball valve comprising a ball valve seat and a ball for closing the main channel or opening the main channel by a fluid flow lifting the ball from the ball valve seat;
a pump chamber, wherein the pump chamber is a bypass channel configured to bypass the ball valve; and
a venting valve that provides an end stop for the ball of the ball valve.

\* \* \* \* \*